July 24, 1928.　　　　　　　　　　　　　　　　　　　　1,677,936
C. H. THORDARSON
ELECTRIC MOTOR
Filed Feb. 27, 1925　　　　　2 Sheets-Sheet 1
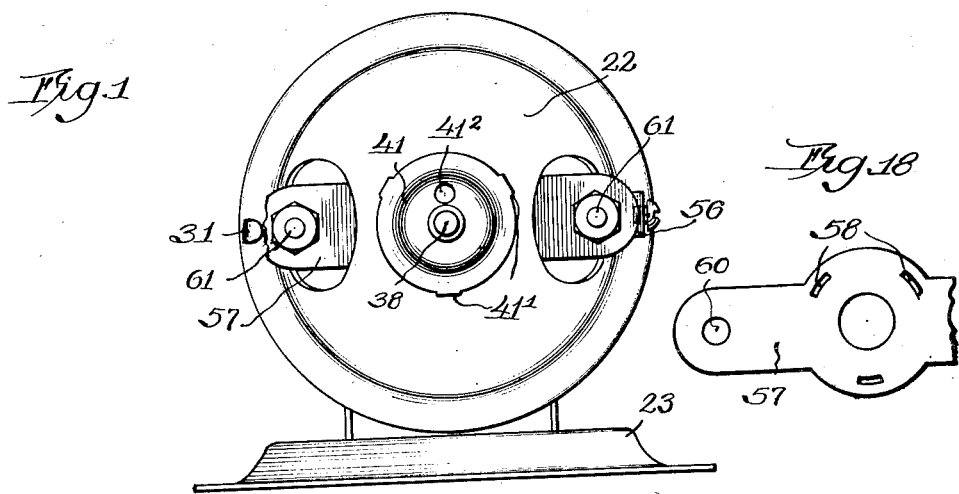
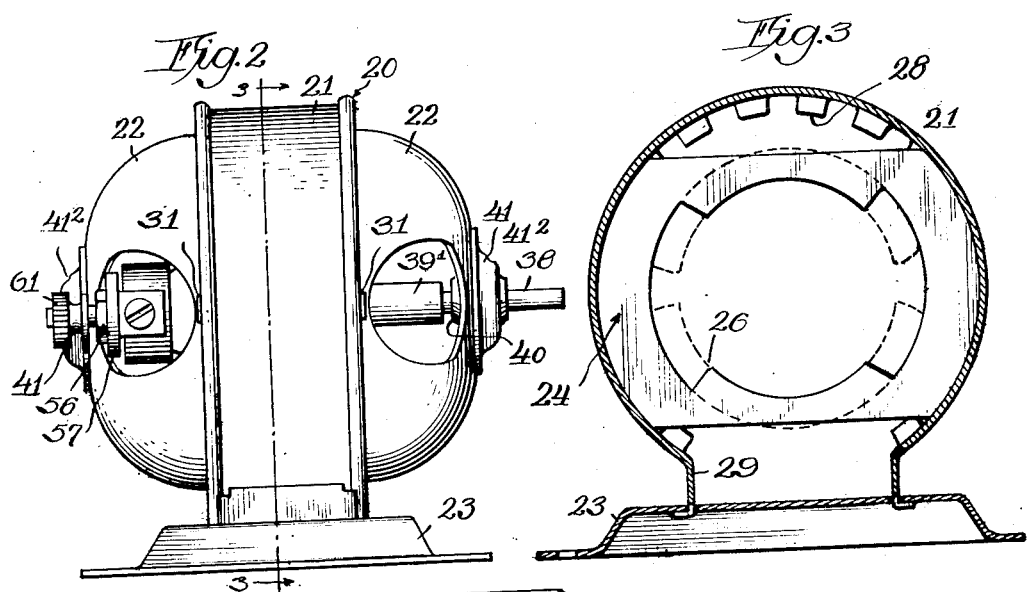
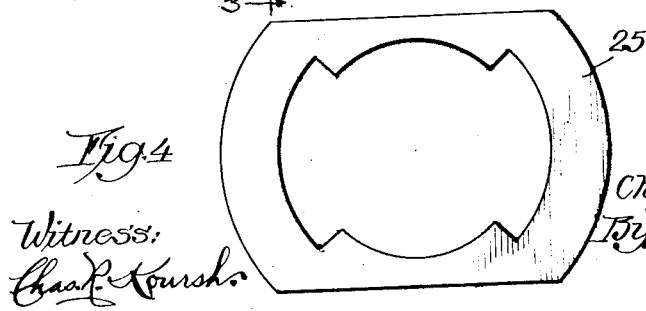
Inventor,
Chester H. Thordarson, July 24, 1928.  C. H. THORDARSON  1,677,936
ELECTRIC MOTOR
Filed Feb. 27, 1925   2 Sheets-Sheet 2
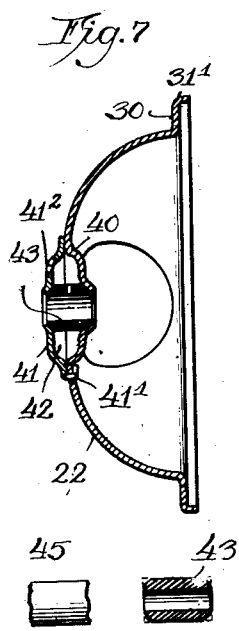
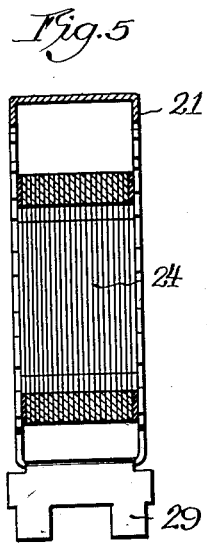
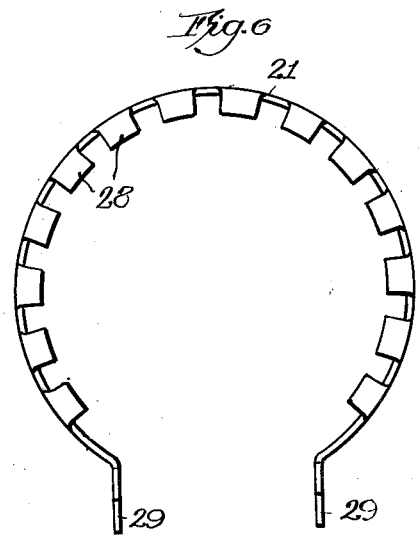
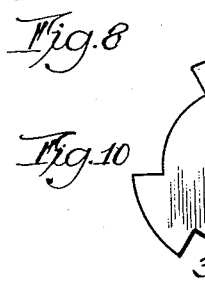
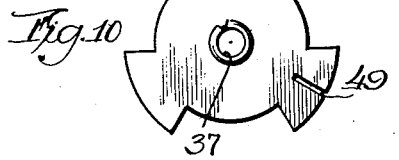
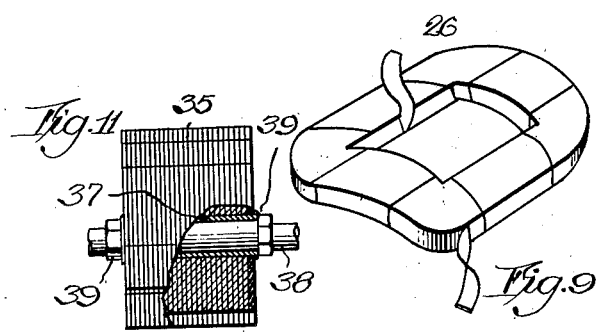
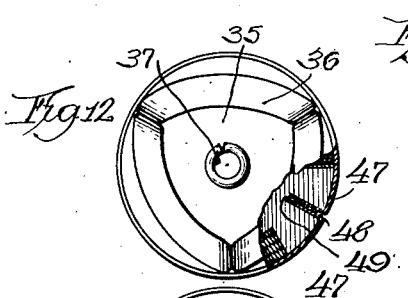
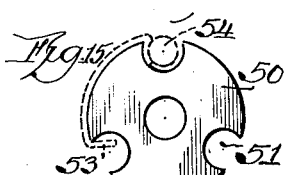
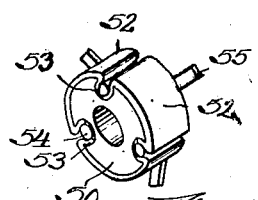
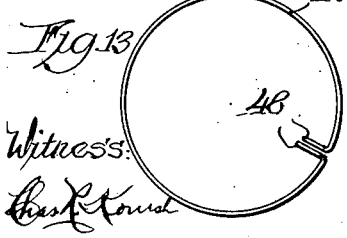
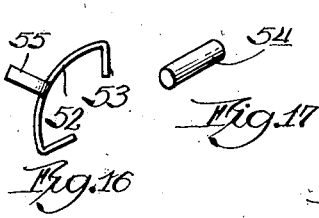
Inventor
Chester H. Thordarson,
By William H. Hart Attys.
Witness:

Patented July 24, 1928.

1,677,936

UNITED STATES PATENT OFFICE.

CHESTER H. THORDARSON, OF CHICAGO, ILLINOIS.

ELECTRIC MOTOR.

Application filed February 27, 1925. Serial No. 12,045.

This invention relates to improvements in electrical motors and similar machines, and refers in part to a novel motor, of which the operative parts and the frame can be made largely by stamping and swaging operations; to a motor and similar machine which is efficient as an electrical unit and which may be produced at small cost, and is light and compact as compared to motors made according to common practice, and which is well adapted to fractional motor practice, and to an improved self-aligning bearing for the armature or rotor shaft of such machines.

The invention has for its objects to otherwise simplify and improve electrical motors and similar machines, and the invention consists in the elements and the combination of elements shown in the drawings and described in the specification, and is pointed out in the appended claims.

In the drawings:

Figure 1 is an end elevation of the motor with parts broken away.

Figure 2 is a side elevation thereof.

Figure 3 is a section on the line 3—3 of Figure 2 with the armature omitted.

Figure 4 is an elevation of one of the laminæ constituting the core for the field winding.

Figure 5 is a section of an element of the motor frame, showing in section the laminated field core disposed therein.

Figure 6 is an end elevation of a central element or ring of the motor frame.

Figure 7 is a sectional view of one of the sheet metal ends of the motor frame.

Figure 8 is a detail of one of the armature shaft bearings.

Figure 9 is a perspective view of one of the field windings which is generally similar to but larger than the armature winding.

Figure 10 is an end view of the armature core.

Figure 11 is a side view of the armature core partially broken away to show the manner of connecting it to its shaft.

Figure 12 is an end view of the armature.

Figure 13 is an end edge view of a binding ring of the assembled armature.

Figure 14 is a perspective view of the commutator body and bar.

Figure 15 is an end elevation of the commutator body, showing the manner of assembly and locking the bars thereon.

Figure 16 is an end elevation of one of the commutator bars and its terminal.

Figure 17 is a perspective view of a locking pin for locking the commutator bars to the armature body.

Figure 18 is an elevation of the brush support, broken away.

As shown in the drawings, 20 (Figure 2) designates as a whole the frame of the motor, comprising in principal part a central body ring 21 and two bell shaped end casings 22, 22; and 23 designates the base of the motor. In accordance with one phase of the invention, said parts are cut and formed of sheet metal.

24 designates the field core made of metal laminæ 25 (Figures 4 and 5). 26 designates the field coils which are made up of flat slab-like windings, preferably wound as flat windings and bent in flattened curved formation to interlock with the interior faces of the field core. Preferably, and as shown, the field coils are made of flat or ribbon wires, the turns of which are insulated in any suitable manner.

The field core, in accordance with one feature of my invention, is locked in the frame 21 by forming on the opposite side margins of said ring-like frame radially turned spurs or lugs 28 (Figure 6) which are bent inwardly to overlap the margins of said core, as best shown in Figures 3, 5 and 6 to produce a rigid supporting connection between said core and ring-like frame. The frame is fastened to the base 23 by means of other spurs or extensions 29 of the open ring-like frame which extend downwardly through openings in the flat body of the base and are clenched thereunder, as best shown in Figures 3, 5 and 6, or in other suitable manner to hold the ring member closely on the field core and to produce a rigid connection between the frame and base and the frame on the core.

The ring-like frame 21 is fixed to the end members 22 by using certain of said spurs or lugs 28, of said frame member, and extending them through openings of the flanges 30 of the end member 21, and clenching them over said flanges, as indicated at 31 in Figures 1 and 2. Said latter connections are made at diametrically opposite parts of the frame and, by reason, in addition thereto of the clasping of the beads 31' about the end edges of the ring-like frame member 21 and the connection of said frame member with the base through the extensions 29, a very strong connection between said frame parts, one which maintains proper coaxial relation of the armature shaft bearings in said end frame parts, as will hereinafter appear, and a rugged connection of the frame to the field pole, is assured.

The armature of the motor comprises the laminated core 35, as shown in Figures 10, 11 and 12, and the armature windings 36, best shown in Figure 12, and preferably wound and formed as are the field windings 26, as shown in Figure 9. The laminæ of the armature core are locked together to produce the core structure by means of a tube 37, preferably rolled from sheet metal and which extends through axial openings in said laminæ and are upset or riveted over the outer faces of the endmost laminæ of the armature core.

38 designates the armature shaft which is made fast to the armature core structure in any suitable manner, so that said parts rotate as a unitary structure. This connection can be effected by threading that portion of the armature shaft that extends through, and just beyond the armature core, and threading lock nuts 39 on said shaft in a thread direction that will endwise engage said tube 37 and will bind the armature core on the shaft.

The elements of the armature, comprising the laminated core and the windings are bound together to produce a rugged unitary structure and to prevent displacement of the parts, due to centrifugal force, by open bands 47, shown in Figures 12 and 13 which encircle the core and the parts of the windings exterior thereto, and are bent inwardly at their ends to produce radial, inwardly extending lugs 48 that are adapted to be driven into and lie side by side in a holding slit 49 formed on one of the pole pieces of the armature core structure, as best shown in Figures 12 and 13.

The said armature shaft is mounted in bearings coaxial with each other and disposed axially in the bell shaped end casing shells 22. These bearings are of peculiar construction to give self-centering function thereto. They constitute one feature of my invention, and are made as follows:

The central portions of said end casing shells are swaged inwardly to produce cups 40 (Figures 1, 2 and 7), and exterior to said cups are disposed complemental, separate cups 41, which are formed of sheet metal, with their concave faces disposed inwardly and opposing the concave faces of the integral cups 40 to thereby produce bearing chambers 42. Both the cup formations have central openings. Within these chambers and extending axially therethrough are bearing members 43 which are mounted to have oscillating action to turn in the said central recesses of the cup formations so as to permit said bearing members to turn relatively to the cup-like formations and one to the other to produce self-centering bearings for the shaft 38, and also to maintain the armature and the field of the motor coaxial and with their pole faces maintained properly spaced. This construction produces a well centered and balanced armature and field, notwithstanding slight inaccuracies of fit of the parts of the frame, due to the assembling of swaged or stamp sheet metal parts. The cup formations can be readily applied to the motor casing ends by proper angularly spaced spurs 41' extending through the casing end and clenched thereon, as shown in Figure 7.

As another feature of improvement in such self-centering bearings, the bearing members 43 can be made from short parts of a hollow tube 45, shown in Figure 8, the sections being cut off in proper lengths to produce the proper length of bearing sleeves. Thereafter a cylindric curvature is given to their ends, as indicated by a comparison of the full and dotted lines in Figure 8, to enable the bearing members to rock or oscillate during the self-centering function of the bearings. This method of producing the bearing members 43 affords ample lengths of bearing area between them and the shaft, and also allows said bearing members to rock freely relatively to the cups which support them for the self centering function of the mounting of said bearing members. A good means of lubricating said bearings is to form through one wall of each bearing member an oil feed hole, and to produce in the adjacent cap formation an oil hole $41^2$.

A tube 39' encloses the armature shaft between one of the armature binding nuts 39 and the adjacent cup formation to limit end shake of the armature relatively to the field.

The commutator of the motor is made up of a cylindric body 50 of insulating material having a plurality of peripheral notches 51, and a plurality of arc shaped sheet metal (preferably copper) bars 52 that partially encircle said body and are provided with inwardly turned ends 53 that extend into the notches 51, and are locked therein in clamping curved formation by the cylindric or other suitable cross section pins 54, as best shown in Figures 14, 15 and 17. Said commutator bars are formed with integral terminals 55 adapted for soldered connection to the terminals of the armature windings.

The commutator brushes may be made of any suitable formation, not necessary to be herein shown, and preferably spring-pressed against the commutator bars and their insulating spacing elements 54. The brush holder assembly, designated as a whole in Figures 1 and 2 by 56, is carried by a brush supporting bar 57, made of insulating material, such as is shown in Figures 1, 2 and 18. Said bar is centrally enlarged and has a central opening through which the armature shaft can extend, and the bar can be fastened to the frame structure by the spurs 41' by which the associated cup is fixed to the end casing members 22, the central enlarged part of the brush bar for this purpose being provided with slits 58. The said bars are also provided at their ends with openings 60 for attachment of the brush binding posts 61.

I claim:

1. In an electric motor, the combination of a field magnet core and a frame comprising a ring-like member having spurs to engage on and hold the core therein, combined with a sheet metal base, and said ring member being provided with extensions adapted to extend through said base and to be clenched thereunder.

2. An electric motor comprising a field core to support field windings, and a sheet metal casing comprising a ring-like central member and two cup shaped ends, said ring-like member being provided with spurs adapted to be formed over said core to hold it in place and to engage the cup shaped ends to hold them in place, said ends of the casing being each formed with spaced aperture walls to hold a bearing for an armature shaft, and said bearing comprising a tube that is rounded at its ends which engages said openings to permit self centering movement of said tube.

In witness whereof I claim the foregoing as my invention, I hereunto append my signature this 18th day of February, 1925.

CHESTER H. THORDARSON.